(12) United States Patent
Maeda et al.

(10) Patent No.: US 8,069,306 B2
(45) Date of Patent: *Nov. 29, 2011

(54) DATA AREA MANAGING METHOD IN INFORMATION RECORDING MEDIUM AND INFORMATION PROCESSOR EMPLOYING DATA AREA MANAGING METHOD

(75) Inventors: Takuji Maeda, Osaka (JP); Masato Suto, Osaka (JP); Hirokazu So, Osaka (JP); Makoto Ochi, Osaka (JP); Shinji Inoue, Osaka (JP)

(73) Assignee: Panasonic Corporation, Kadoma-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,482

(22) Filed: Nov. 9, 2010

(65) Prior Publication Data

US 2011/0055467 A1 Mar. 3, 2011

Related U.S. Application Data

(63) Continuation of application No. 10/564,817, filed as application No. PCT/JP2004/010287 on Jul. 13, 2004, now Pat. No. 7,840,749.

(30) Foreign Application Priority Data

Jul. 16, 2003 (JP) .................. 2003-275214

(51) Int. Cl.
*G06F 12/00* (2006.01)
*G06F 13/28* (2006.01)
*G06F 17/30* (2006.01)

(52) U.S. Cl. ............... 711/112; 711/118; 711/E12.083; 707/821; 707/999.205

(58) Field of Classification Search ............. 711/112, 711/118, E12.083; 707/821, 999.205
See application file for complete search history.

(56) References Cited

U.S. PATENT DOCUMENTS

| 6,341,331 B1 * | 1/2002 | McNutt ................. 711/113 |
| 7,706,229 B2 | 4/2010 | Ohbi et al. |
| 2003/0033487 A1 | 2/2003 | Pfister et al. |
| 2004/0047602 A1 | 3/2004 | Ohbi et al. |

FOREIGN PATENT DOCUMENTS

| JP | 5-040694 A | 2/1993 |
| JP | 7-175698 A | 7/1995 |
| JP | 8-110868 A | 4/1996 |
| JP | 9-097218 A | 4/1997 |
| JP | 2002-342135 A | 11/2002 |
| JP | 2003100018 A | 4/2003 |

OTHER PUBLICATIONS

"Information technology—Volume and file structure of disk cartridges for information interchange", Nov. 15, 1994, pp. 1-40, second edition, ISO/IEC 9293, ISO/IEC, Switzerland.
International Search Report, directed to PCT/JP2004/010287, mailed on Sep. 14, 2004.

* cited by examiner

*Primary Examiner* — Mardochee Chery
(74) *Attorney, Agent, or Firm* — Smith Patent Office

(57) ABSTRACT

Area management information is cached in a cache memory by controlling the access size when an information processor accesses the area management information in an information recording medium. When the processing content of the information processor is to retrieve a free area from the area management information, a physical management block size determined from the physical characteristics of the information recording medium is used. When the processing content is to acquire a link destination from the area management information, minimum access unit of the information recording medium is used. Consequently, overhead can be lessened when the area management information is accessed.

6 Claims, 11 Drawing Sheets

| | Block Start Address | FAT Address | FAT Size | Update Flag |
|---|---|---|---|---|
| Block 1 | 1st Sector | 1st Sector | 22 Sectors | 1 (Y) |
| Block 2 | 33rd Sector | 60th Sector | 1 Sector | 0 (N) |
| Block 3 | 34th Sector | 61st Sector | 1 Sector | 0 (N) |
| Block 4 | 35th Sector | 23rd Sector | 32 Sectors | 1 (Y) |
| Block 5 | 0xFFFF Sec. | 0xFFFF Sec. | 0xFFFF Sec. | 0 (N) |

|  | FAT Address | FAT Size | Update Flag |
|---|---|---|---|
| Block R1 | 60th Sector | 1 Sector | 0 (N) |
| Block R2 | 61st Sector | 1 Sector | 0 (N) |
| ⋮ | ⋮ | ⋮ | ⋮ |
| Block RM | 0xFFFF Sec. | 0xFFFF Sec. | 0 (N) |
| Block W1 | 1st Sector | 32 Sectors | 1 (Y) |
| Block W2 | 23rd Sector | 32 Sectors | 1 (Y) |
| ⋮ | ⋮ | ⋮ | ⋮ |
| Block WN | 0xFFFF Sec. | 0xFFFF Sec. | 0 (N) |

903

DATA AREA MANAGING METHOD IN INFORMATION RECORDING MEDIUM AND INFORMATION PROCESSOR EMPLOYING DATA AREA MANAGING METHOD

CROSS REFERENCE TO RELATED APPLICATIONS

This application is a continuation application of U.S. patent application Ser. No. 10/564,817 filed on Jun. 16, 2006 now U.S. Pat. No. 7,840,749, currently pending, which was the National Stage of International Patent Application No. PCT/JP2004/010287, filed on Jul. 13, 2004. The National Stage of International Patent Application No. PCT/JP2004/010287 claim priority to Japanese Patent Application No. 2003-275214, filed on Jul. 16, 2003. The disclosures of U.S. patent application Ser. No. 10/564,817, International Patent Application No. PCT/JP2004/010287 and Japanese Patent Application No. 2003-275214 are hereby incorporated by reference.

TECHNICAL FIELD

The present invention relates to a data area managing method of managing data stored in an information recording medium according to a file system and an information processor employing the data area managing method.

BACKGROUND ART

In recent years, management of data stored in an information recording area of an information recording medium such as a semiconductor memory, magnetic disk, optical disk and magneto optical disc has been realized by a file system. In the file system, the information recording area is divided into sectors as minimum access units and clusters which are aggregations of sectors to manage data. One or more clusters are managed as a file.

A FAT file system is an example of file systems conventionally used. The details of the FAT file system are disclosed in ISO/IEC9293, "Information Technology-Volume and file structure of disk cartridges for information", 1994.

The FAT file system is a file system generally used for information devices such as personal computers. In the FAT file system, physical location of a lot of data constituting a file is managed under a unified manner using a table referred to as a FAT (File Allocation Table). Since the information recording medium in which data is managed by the FAT file system can share a file between devices interpreting the same file system, data transfer between devices becomes possible.

In the FAT, one fixed-length entry is used for a cluster. Thus, as the capacity of the information recording medium is larger and the number of the clusters managed in the file system is increased, the size of the FAT becomes larger. When installing the FAT file system in a device, a built-in type device having the limited capacity of memory adopts a method of holding only a part of the FAT in the memory and caching the FAT rather than holding the whole of the FAT in the memory to reduce the memory consumption.

Conventionally, there has been proposed a method of inputting information including the number of data managed in the FAT and location of the FAT into an information recording reproduction device from a host device at initialization and caching all or a part of the FAT, as a method of cashing the FAT. This method is disclosed in, for example, Japanese Unexamined Patent Publication No. 8-110868. According to this method, information concerning an accessed file of the information on the FAT is cached on a cache buffer. In this case, fast access become possible, since there is no need to read the FAT on the recording medium in a reaccess to the file accessed once.

However, the above-mentioned conventional technique has the following problem. The above-mentioned data area managing method intends to speed up an access to an existing file and does not consider a free area retrieval processing. According to the above-mentioned data area managing method, although reaccess to the file accessed once can be performed at high speed, when retrieving a free area and preparing a new file, the FAT needs to be newly read from the information recording medium because the FAT is not cached.

To perform the free area retrieval processing in a conventional method, the status of use of each entry stored in the FAT is checked and a cluster number in a free area is obtained. Especially when the number of free area is decreased, the number of entries to be checked in the free area retrieval processing is increased and in the worst case, the whole FAT needs to be read into a cache buffer when retrieving the free area. Here, when a read unit of the cache buffer is small, the free area retrieval processing takes longer time due to the overhead of read processing.

In the light of the above-mentioned problem, the present invention intends to realize a data area managing method that can lessen the overhead at accessing to the FAT by changing the read unit of the FAT according to processings performed using the FAT, for example, the free area retrieval processing and a link destination acquisition processing and to provide an information processor using the data area managing method.

DISCLOSURE OF INVENTION

The data area managing method for an information recording medium of the present invention is used in an information processor that manages data stored in an information recording area in the information recording medium as a file. When the information processor accesses area management information that manages free area state and link state of the information recording area in the information recording medium, access size is changed according to processing content in the information processor.

The information processor of the present invention is a processor which accesses an information recording medium managing data stored in an information recording area by a file system and which comprises: a FAT cache, a volatile memory, a FAT cache controller and a file system controller. The FAT cache reads and stores area management information which manages a free state and link state of said information recording area from said information recording medium. The volatile memory holds, data including a start address of each block, location of the area management information stored in each block on said information recording medium, size of each block, and presence or absence of update, as FAT cache management information for managing said FAT cache by dividing said FAT cache into a plurality of blocks. The FAT cache controller refers to and updates said FAT cache management information and controlling a read and change of said area management information to said FAT cache. The file system controller accesses to said area management information through said FAT cache controller and storing data in the information recording medium as a file.

BEST MODE FOR CARRYING OUT THE INVENTION

A data area managing method in an information recording medium and an information processor according to the present invention will be described below with reference to drawings.

Embodiment 1

Figure 1:
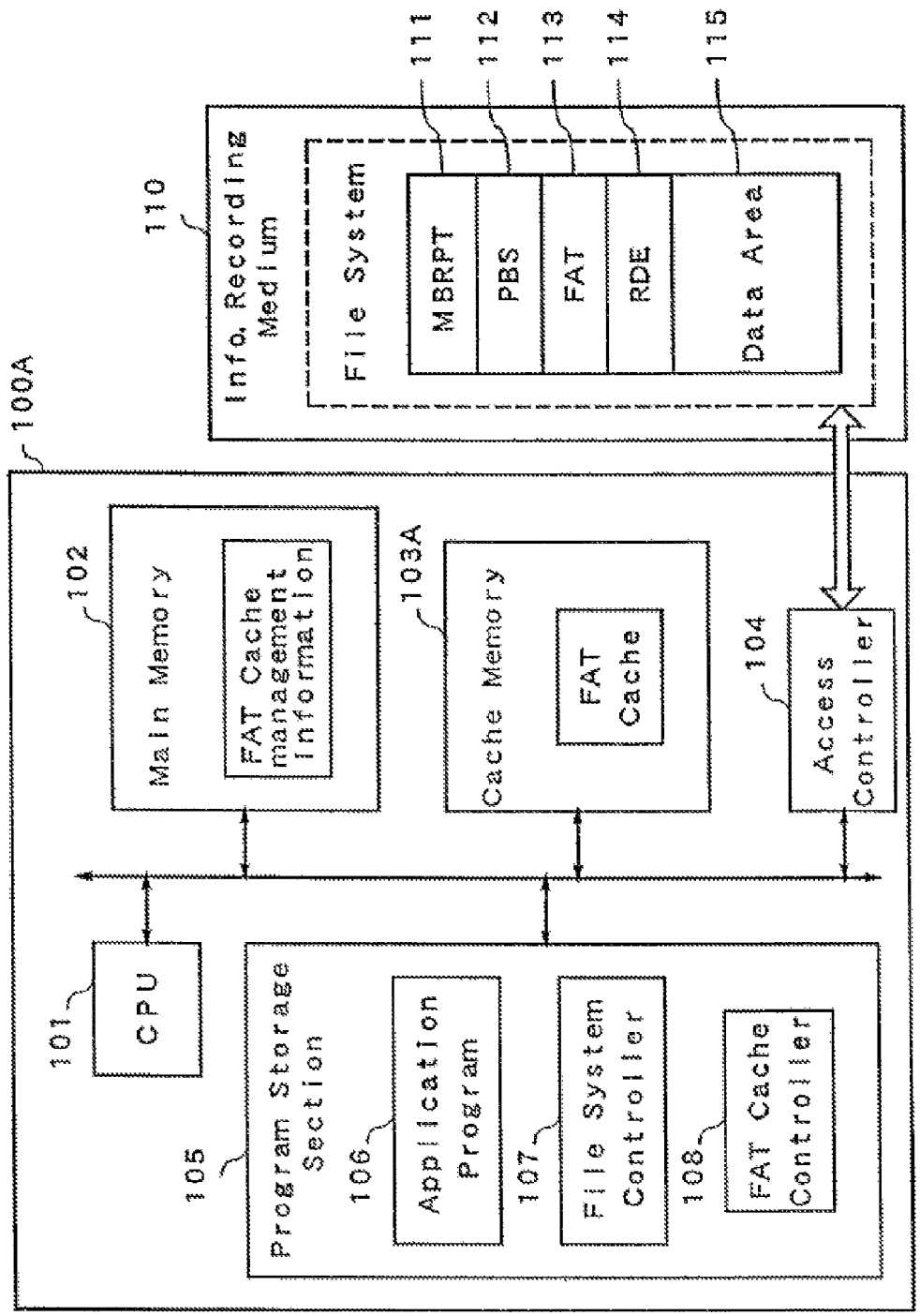
FIG. 1 is a configuration view of an information processor and an information recording medium in embodiment 1 of the present invention.

FIG. 1 is a configuration view of an information processor and an information recording medium in a embodiment 1 employing a data area managing method of the present invention. In FIG. 1, an information processor 100A includes a CPU 101, a main memory 102, a cache memory 103A, an access controller 104 and a program storage section 105.

The main memory 102 is a memory which stores a program run on the information processor 100A therein. The cache memory 103A is a memory used for caching a FAT or data. The access controller 104 is a controller which controls an access to an information recording medium 110. The program storage section 105 is a memory which stores a program run on the information processor 100A and so on therein.

The cache memory 103A includes a FAT cache for caching the FAT. To manage the FAT cache, the main memory 102 stores FAT cache management information therein. The program storage section 105 has an application program 106, file system controller 107, and FAT cache controller 108. The application program 106 is a program run on the information processor 100A. The file system controller 107 controls a file system constructed on the information recording medium 110. The FAT cache controller 108 controls the FAT cache.

On the other hand, a file system is constructed on the information recording medium 110. The file system manages data stored in the information recording medium 110 as a file. The information recording medium 110 in this embodiment is managed by the FAT file system. The information recording medium 110 has a management information area which stores area management information as file system management information therein and a data area which stores data therein. The management information area is provided with a master boot record and partition table (MBRPT) 111, a partition boot sector (PBS) 112, a FAT 113 and a route directory entry (RDE) 114.

The MBRPT 111 stores information for managing the information recording area in dividing the information recording area into a plurality of areas called as partitions therein. The PBS 112 stores management information in one partition therein. The FAT 113 indicates physical storage location of the data contained in the file. The RDE 114 stores information of the file and directory which lies immediately below a root directory therein. The FAT 113 is an important area indicating physical storage location of the data contained in the file and thus, two FATs 113, each of which has the same information, exist in the information recording medium 110 for duplexing.

The data area 115 is managed in divided into a plurality of clusters and each cluster stores the data contained in the file therein. Such the files as they contain a lot of data use a plurality of clusters as the data storage area. Connection between clusters is managed by link information stored in the FAT 113.

Figure 2A:
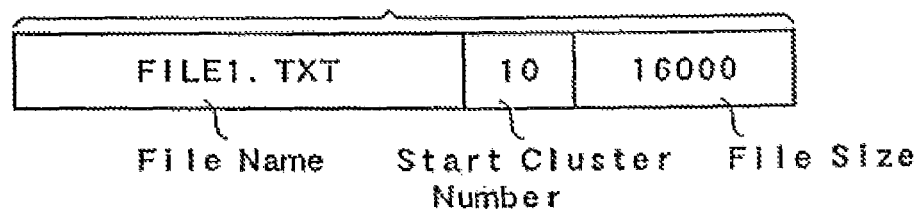
FIGS. 2A-2C are views showing an example of the data storage in a FAT file system.

Referring to FIG. 2, an example of reading the file data in the FAT file system will be described. As shown in FIG. 2A, the root directory entry 114 and data area 115 store, in a part of them, a directory entry 201 storing a file name, file size, and etc. The data area which stores file data is managed in units of clusters. A uniquely distinguishable cluster number is given to each cluster. To identify the cluster storing the file data therein, a cluster number of the cluster storing a head of the file data, that is, a start cluster number is stored in the directory entry 201. The example of the directory entry 201 in FIG. 2A shows that a file named as FILE1.TXT stores data starting from the cluster number 10.

Figure 2B:
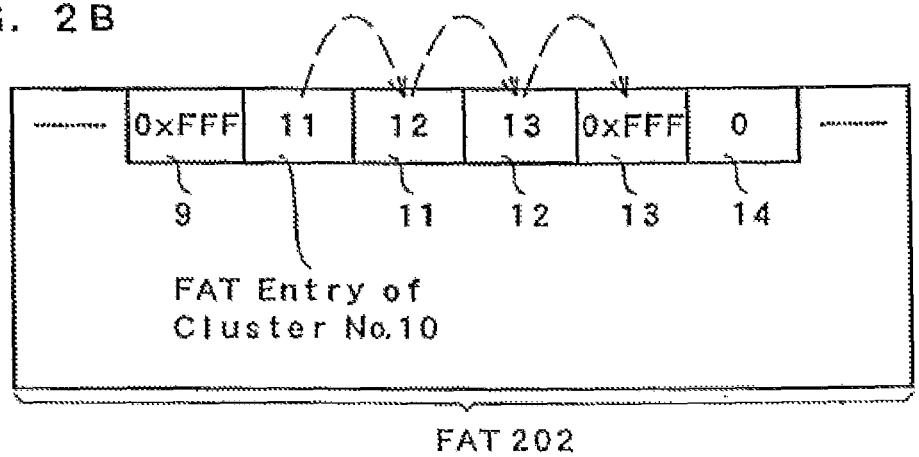

Concerning a file whose data is stored in a plurality of clusters, it is necessary to identify the cluster number succeeding the start cluster number and track the clusters which store the data therein. Thus, link information of the clusters is stored in the FAT. FIG. 2B shows an example of the FAT 202. FAT 202 is provided with fields corresponding to the respective cluster number. Each field stores a FAT entry indicating the link information of each cluster therein. The FAT entry indicates the cluster number of the cluster to be linked with next. In the example in FIG. 2B, "11" is stored as the FAT entry corresponding to the cluster number 10. This means that the cluster with the cluster number 10 is linked to the cluster with the cluster number 11. Similarly, "12" and "13" are stored as the FAT entry corresponding to the cluster number 12 and the FAT entry corresponding to the cluster number 13, respectively and the clusters are linked to each other in sequence such as cluster numbers 10, 11, 12 and 13. Next, "0xFFF" is stored as the FAT entry corresponding to the cluster number 13. Since "0xFFF" means termination of the link, the link starting from the cluster number 10 terminates in four clusters 10, 11, 12 and 13. "0" stored as the FAT entry corresponding to the cluster number 14 indicates that the cluster is not assigned for the file and serves as a free area.

Figure 2C:
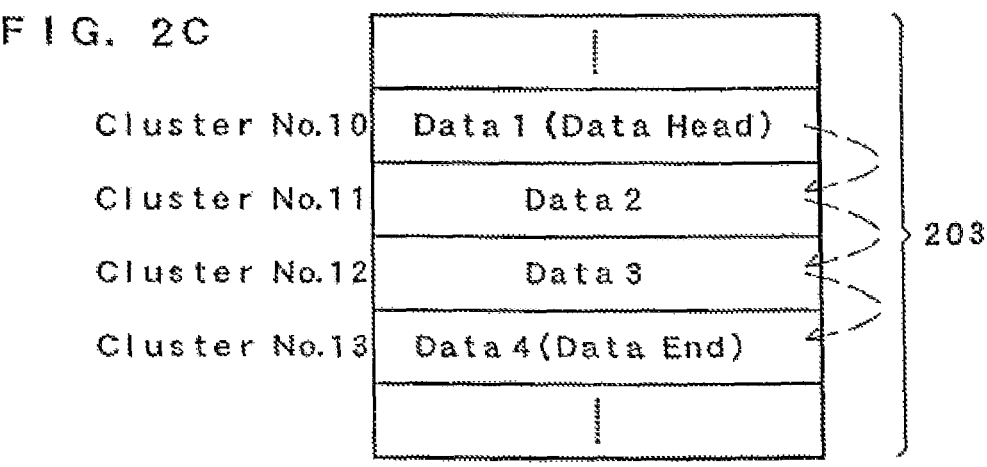

When it is recognized that the data area assigned for the file FILE1.TXT is the clusters with the cluster numbers 10, 11, 12 and 13 as shown in FIGS. 2A and 2B, in reading the data in the file FILE1.TXT, data of the cluster numbers 10, 11, 12 and 13 in the data area 203 is read sequentially as shown in FIG. 2C.

Referring to FIG. 3, an example of writing the file data in the FAT file system will be described below. As in the example in FIG. 2, it is assumed that the directory entry 201 shown in FIG. 3A is stored in a part of the route directory entry or data area. In a file indicated in the directory entry 201, the file is named as FILE1.TXT and stores its data starting from the cluster number 10. Since the file size is 16000 bytes and size of one cluster is 4096 in the example in FIG. 3, the file data is stored in four clusters.

Figure 3A:
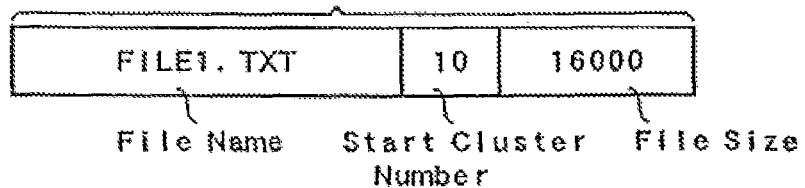
FIGS. 3A-3D are views showing an example of the writing of file data in the FAT file system.
Figure 3B:
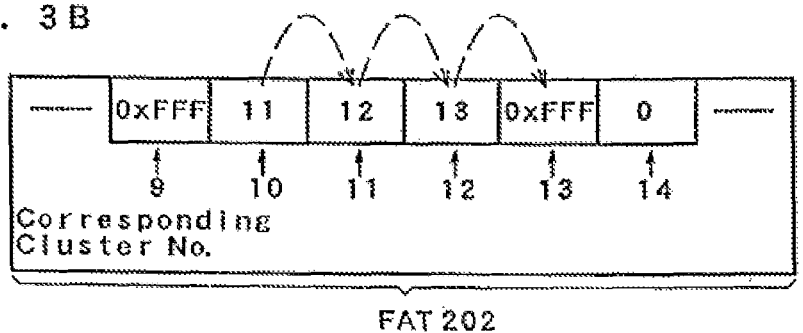

FIG. 3B shows the state of the FAT 202 prior to writing to the file. As in the case in FIG. 2B, the FAT in FIG. 3B shows that four clusters 10, 11, 12 and 13 are linked with, and that the data of the file FILE1. TXT is stored in four clusters 10 to 13.

Here, assuming the case where data of 1000 bytes is written to FILE1. TXT, the file size changes from 16000 bytes to 17000 bytes. However, four clusters originally secured for the data storage can only store data of 16384 bytes at a maximum, it is necessary to assign a new free cluster to store the data therein.

Figure 3C:
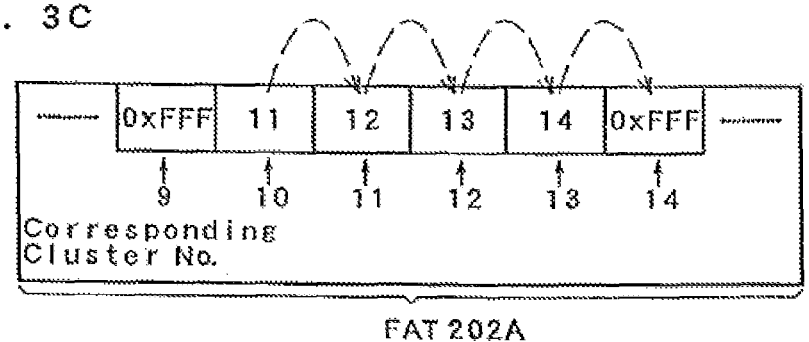
Figure 3D:
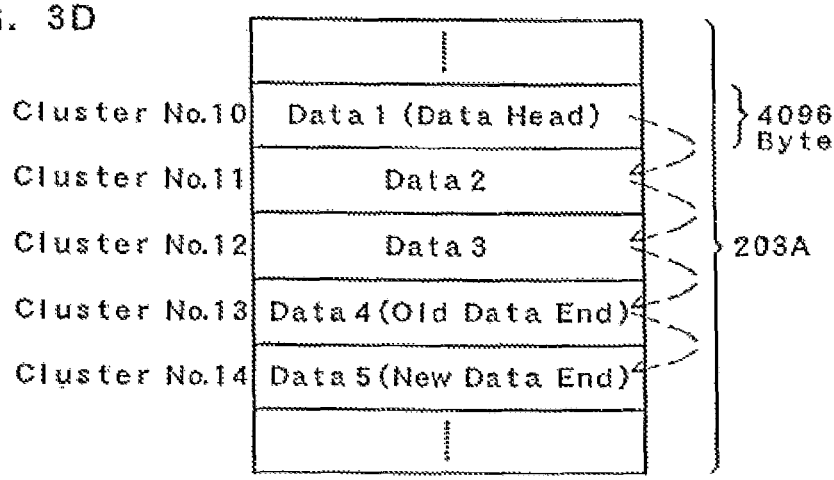

Assignment of a free area is achieved by acquiring the free cluster from the FAT and changing the link of the FAT. A link changing procedure is as follows. First, an entry storing "0" representing a free cluster is acquired from the FAT 202 in FIG. 3B. In the case of FIG. 3B, a cluster with the cluster number 14 is a free cluster. Subsequently, the acquired free cluster is linked to termination of the link of the file to be extended its file size. FIG. 3C shows the state of the FAT 202 after changing the link and a destination to be linked to the cluster number 13 as the end of FILE1. TXT is changed to "14". A link destination to the cluster number 14 is changed to "0xFFF" indicating the end of link. According to this processing, as shown in FIG. 3D, in FILE1. TXT, five clusters of "10", "11", "12", "13" and "14" are assigned as data region 203A for the file, $16001^{st}$ to $16384^{th}$ bytes are written to the area with the cluster number 13 and $16385^{th}$ to $17000^{th}$ bytes are written to the area with the cluster number 14 to perform writing of data.

As described above, the free area retrieval processing in the data writing processing is to acquire an entry storing "0" from the FAT. However, when the information recording medium 110 stores a lot of files therein, a lot of FAT entries need to be checked to find the free area. In the worst case, all of the entries of the FAT must be checked to find the free area. For this reason, to retrieve the free area at high speed, one method can eliminate the need for processing of reading from the information recording medium 110 by reading the whole FAT into the memory of the information processor 100 from the information recording medium 110 and retrieving the free area on the memory. However, since the FAT becomes larger in proportion to the capacity of the information recording medium 110, when there is not enough capacity of the memory to hold the whole FAT, another method which holds only a part of the FAT in the memory and caches it is used.

In caching the FAT, if the size to be read from the information recording medium 110 at one time is increased, an overhead for reading of the FAT can be lessened when the whole FAT is read in the free area retrieval processing. However, in reading the file data, since the location of the FAT to be referred next is previously known in the link destination acquisition processing for tracking the destination to be linked, it is more efficient as the size of the FAT to be read is smaller.

Therefore, an object of the present invention is to change an access method to the FAT and to improve efficiency of processing on the basis of the free area retrieval processing and the link destination acquisition processing which are different from each other in characteristics in access to the FAT as described above. Accordingly, even when the large-capacity information recording medium 110 is used, worst processing time in the free area retrieval can be shortened and further processing time in the link destination acquisition processing can be prevented from increasing.

Before describing the data area managing method as the object of the present invention, features of the information recording medium using a semiconductor memory as a device for recording information will be described below. Since the semiconductor memory can form a compact and light-weight information recording medium, it has been securing the place as the information recording medium in various technical fields. The semiconductor memory is formed of a nonvolatile memory such as EEPROM and Flash ROM. An NAND memory, especially used in a lot of information recording media, has a feature of writing data with a clean slate, because recorded data needs to be erased once before writing data.

Here, the unit in erasing data is called as an erase block. The erase block is managed as a block which is composed of a plurality of sectors as minimum access units. That is, although an access can be performed in units of sectors (for example, 512 bytes), a data erasure processing required to be performed prior to writing is carried out in units of erase blocks (16 kB). For example, a Flash ROM which takes 200µ sec. for a writing processing for one sector, 2 m sec. for an erasure processing for one erase block (16 kB) and 3 m sec. for overhead for issuance of command is assumed. The writing time for one erase block (16 kB) of the Flash ROM amounts to 11.4 m sec. by adding 2 m sec., 32×200µ sec. and 3 m sec. Furthermore, writing time for one sector amounts to 5.2 m sec. by adding 2 m sec., 1×200µ sec. and 3 m sec. That is, when data of 16 kB is written in units of erase blocks, it takes 11.4 m sec. for writing time per 16 kB, and when data of 16 kB is written in units of sectors, it takes 166.4 m sec. for writing time per 16 kB. In this manner, when writing is performed in units of erase blocks, the writing time becomes smallest.

The phenomenon that access is performed fastest in units of blocks of a certain size is a feature owned by not only the information recording medium using the semiconductor memory but also some hard disks and optical disks. If the present invention is applied to the information recording medium in which the fastest access is achieved in accessing in units of blocks of such specific size, the effect is further enhanced.

Figure 4:
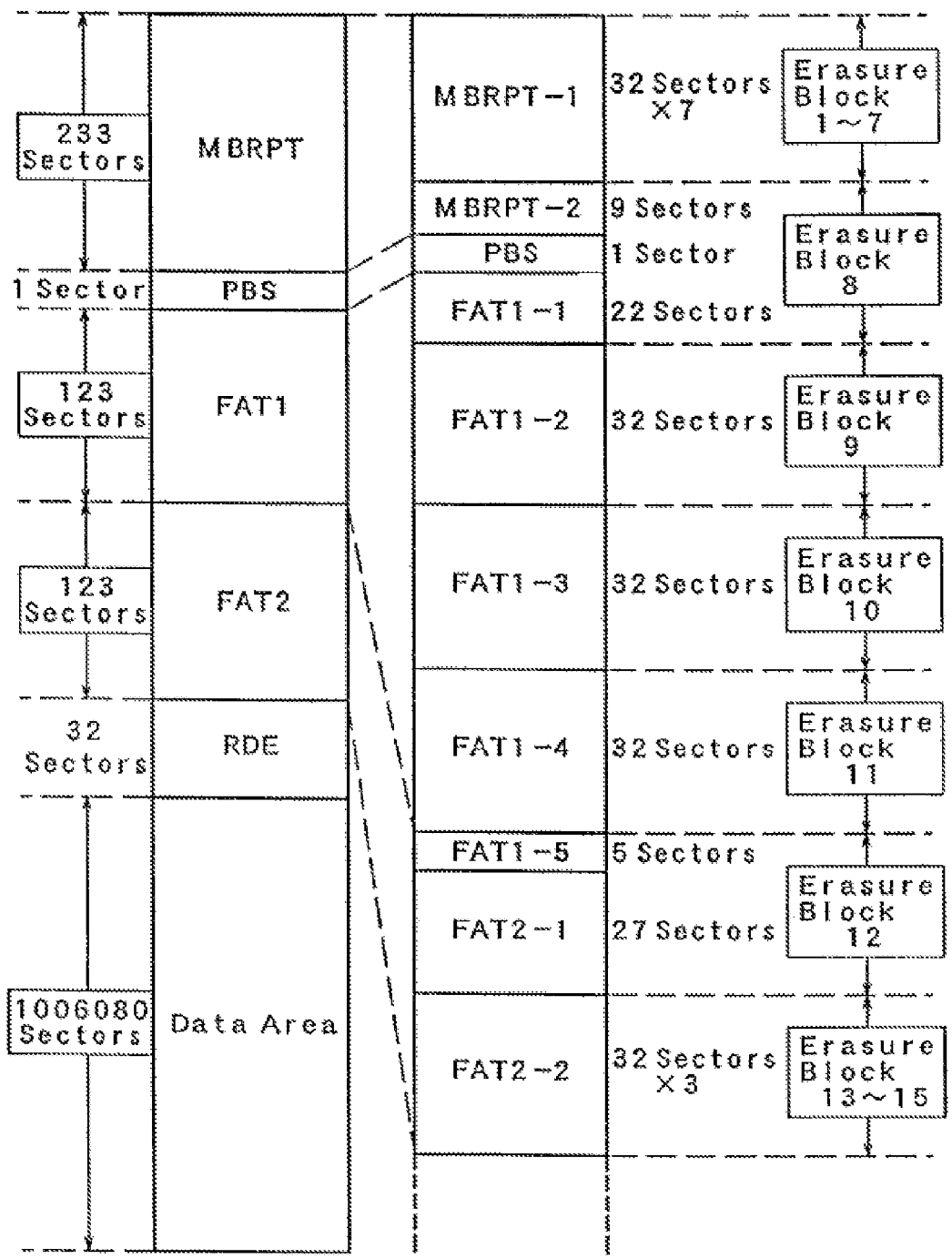
FIG. 4 is a view showing an example of a file system constructed on the information recording medium.

A data area managing method according to embodiment 1 will be described below. FIG. 4 is an explanation view showing an example of a file system constructed on the information recording medium. The example in FIG. 4 assumes the case where a semiconductor memory is used as the information recording medium. The minimum access unit is defined as one sector (512 bytes) and the above-mentioned erase block is defined as 32 sectors (16 kB). The FAT has the size in proportion to the capacity of the information recording medium. Since the FAT is generally disposed without regard to the erase block, as shown in FIG. 4, a head of the first FAT1 of dual FATs is disposed in the middle of the erase block. Further, the FAT1 has the size of 123 sectors and is disposed over five erase blocks of the erase blocks 8 to 12. According to the data area managing method in this embodiment, by caching the FAT in units of erase blocks in the free area retrieval processing, access to the FAT can be rapidly performed.

Subsequently, a FAT cache will be described. FIG. 5 is a view showing an example of a FAT cache 501 existing on the cache memory 103A. The FAT cache 501 uses a certain area in the cache memory 103A and is managed by the FAT cache controller 108. The FAT cache controller 108 repeats generation and release of a plurality of cache blocks in the cache memory 103A assigned for the FAT cache 501 to retrieve the free area. Furthermore, the FAT cache controller 108 provides the function of acquiring a link destination for the file system controller 107.

Figures 5A, 5B:
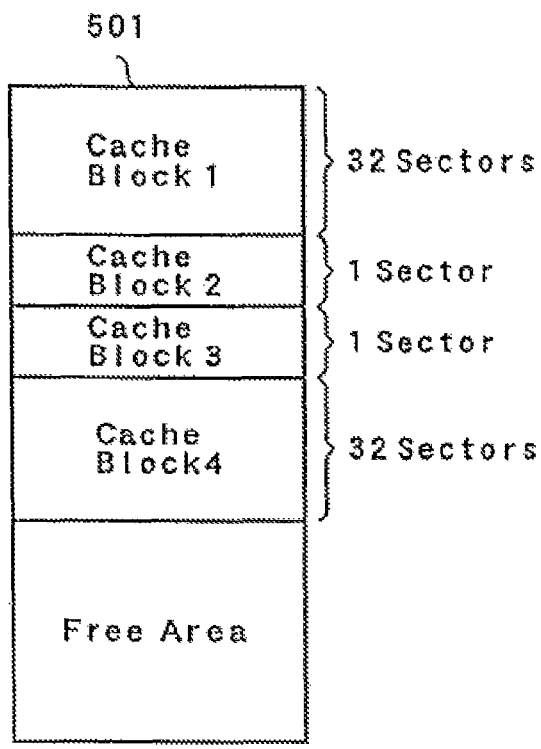
FIGS. 5A-5B are views showing an example of a FAT cache in embodiment 1.

In the example in FIG. 5A, four cache blocks exist in the FAT cache 501 and the FAT is read from the information recording medium 110. The block size of the cache block is 32 sectors as the erase block size or one sector as the minimum access size. In the example in FIG. 5A, the block size of the cache blocks 1 and 4 is 32 sectors and the block size of the cache blocks 2 and 3 is 1 sector. Remaining area is managed as the free area and used as the area in which a cache block is newly generated in case of misfit in cache.

FIG. 5B is a view showing an example of FAT cache management information 502 which stores management information of the FAT cache 501 therein. FIG. 5B corresponds to the FAT cache 501 in FIG. 5A. The FAT cache management information 502 includes a block start address, FAT address, FAT size and update flag.

The block start address indicates start location on the FAT cache 501 of the cache block. The FAT address indicates a region of a FAT read into the cache block lies in the FAT. The FAT size indicates the size of the FAT read into the cache block. The update flag is a flag which indicates whether or not the FAT in the cache block is updated.

In the example of FIG. 5B, the cache block 1 exists from a leading position of the FAT cache 501, the FAT for 22 sectors is read from the head of the FAT of the information recording medium and a part of the FAT in the cache block 1 is updated. In this embodiment, the leading position is represented as "1", not "0". The cache block 2 exists from $33^{rd}$ sector of the FAT cache 501, the FAT for 1 sector is read from the $60^{th}$ sector of the FAT in the information recording medium and the FAT in the cache block 2 is not updated. Furthermore, "0xFFFF" as information on address and size is set in the FAT cache management information 502 corresponding to the cache block 5, which indicates that there exists no cache block 5. Here, a decimal value 65535 corresponding to "0xFFFF" is a value which is not used as a valid address or size in this embodiment.

Figure 6:
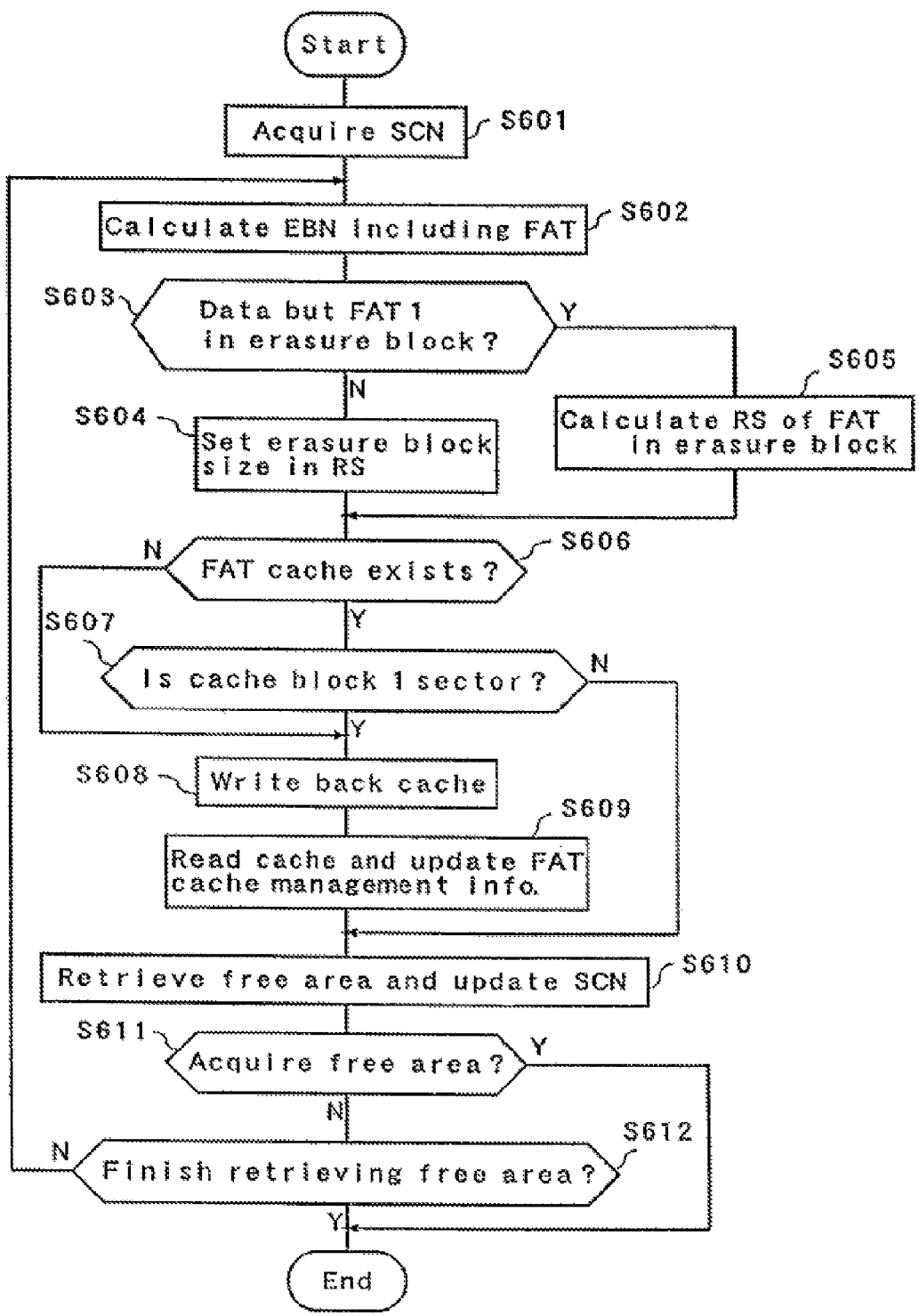
FIG. 6 is a flow chart showing a free area retrieval processing in embodiment 1.

Using the case where the information recording medium and FAT cache are in the state shown in FIGS. 4 and 5 as an example, the free area retrieval processing in this embodiment will be described. FIG. 6 is a flow chart showing flows of the free area retrieval processing in this embodiment. The free area retrieval processing is performed in response to a file access request issued from the application program 106 to the file system controller 107 in FIG. 1. At this time, the file system controller 107 requests a free area retrieval for the FAT cache controller 108 and the FAT cache controller 108 performs free area retrieval. The FAT cache controller 108 reads the FAT in the FAT cache as appropriate, and returns the cluster number of the acquired free area to the file system controller 107 after retrieving the free area.

In the free area retrieval processing, first, a cluster number, SCN, from which retrieval of free area is started is acquired (S601). The cluster number at the location where free area retrieval is finished last time is held in the SCN and is used in the next free area retrieval processing.

Next, an erase block number, EBN, including the FAT which stores an entry of the FAT corresponding to the SCN is calculated (S602). It is assumed that the SCN is "2" and the corresponding entry of the FAT is stored in the leading sector of the FAT in the example shown in FIGS. 4 and 5. At this time, the leading sector of the FAT1 having the size of 123 sectors is included in the erase block 8 as shown in FIG. 4. Thus, the EBN is calculated as "8". Similarly, when a value of the SCN is large and the corresponding entry of the FAT exists at $100^{th}$ sector of the FAT, the $100^{th}$ sector of the FAT 1 is included in the area FAT1-4 shown in FIG. 4. Accordingly, the EBN is calculated as "11".

Next, it is confirmed whether the erase block represented by the EBN includes data other than FAT1 (S603). For example, when the EBN is "8", as shown in FIG. 4, the erase block 8 includes a part of MBRPT and the PBS. Thus, Yes is determined at S603 and the operation proceeds to processing at S605. When the EBN is "11", as shown in FIG. 4, the erase block 11 includes only data of the FAT1. Thus, No is determined at S603 and the operation proceeds to processing at S604.

When No is determined at S603, the erase block size of 32 sectors is set as FAT reading size RS (S604). When Yes is determined at S603, a data length of the FAT in the erase block is calculated as the FAT reading size RS (S605). In the example in FIGS. 4 and 5, this processing is performed when the EBN is "8" or "12". When the EBN is "8", 22 sectors are set as the RS and when the EBN is "12", 5 sectors are set as the RS. When the head of the FAT is to be read, a location in the middle of the erase block is set as a starting location of the reading. That is, when the EBN is "8", $11^{th}$ sector in the erase block 8 is set as the starting location of the reading. Though the above-mentioned processing, the reading location and reading size of the FAT on the information recording medium are determined.

Next, it is determined whether or not the FAT in the area to be read has already existed in the FAT cache (S606). When the FAT exists, it is determined whether or not the size of the cache block is 1 sector (S607). When it is not 1 sector, the target FAT has already existed in the FAT cache, thus the operation proceeds to the processing at S610 as the processing after acquisition of the cache block.

When the FAT in the area to be read does not exist in the FAT cache at S606 or the size of the cache block is 1 sector at S607, re-reading of the FAT becomes necessary. Prior to re-reading of the FAT, write-back processing of the FAT cache is performed (S608). In the write-back processing, when the FAT in the area to be read has already existed in the FAT cache, on the condition that it is updated on the FAT cache, the target cache block on the FAT cache is released after writing the FAT into the information recording medium. When the free area in the FAT cache is less than the erase block size (32 sectors), to secure the free area necessary for re-reading of the FAT, arbitrary cache block is released in the similar procedure to the previous release procedure.

Next, the FAT is read into the FAT cache from the information recording medium to update the FAT cache management information (S609). Through the above-mentioned processing, the FAT containing the entry at a starting location of the free area retrieval becomes to exist in the FAT cache.

The free area is retrieved in the cache block on the FAT cache (S610). To retrieve the free area, the entry is sequentially referred from the retrieval start cluster number, SCN, and it is confirmed whether or not the value of the entry is "0" indicating the free area. When the value is not "0", a next entry is referred and processing is repeated until the entry of "0" is found. At the time when the entry being "0" is found, the retrieval start cluster number is changed to the current reference location. When no free area is found in the cache block currently referred, the retrieval start cluster number is changed to the termination location of the cache block currently referred.

When the free area is acquired in the processing at S610, the cluster number of the acquired free area is informed to the file system controller 107 to finish the processing (S611). When the free area cannot be acquired, on the condition that the retrieval of all area of the FAT has not completed yet, the operation returns to the processing at S602 and the free area retrieval processing is continued from the retrieval start cluster number changed at S610 (S612). If the retrieval of all area of the FAT has completed, it is determined that no free area exists and the fact of that is informed to the file system controller 107 to finish the processing.

In the above-mentioned free area retrieval processing, when retrieval is started from the retrieval start cluster number at S601 and no free area is found even if retrieval is performed up to the termination of the FAT, retrieval is continued from the head of the FAT to the retrieval start cluster number at S601. That is, at the time when all area of the FAT is retrieved for the free area, the retrieval processing is finished.

As described above, in the free area retrieval processing of this embodiment, the FAT is accessed in units of erase blocks and read into the FAT cache. After the free area retrieval processing, the FAT cache is updated when data is written to the acquired free area. Consequently, since the FAT is accessed also in the case of write-back of the FAT to the information recording medium in units of erase blocks, the FAT can be rapidly accessed.

Figure 7:
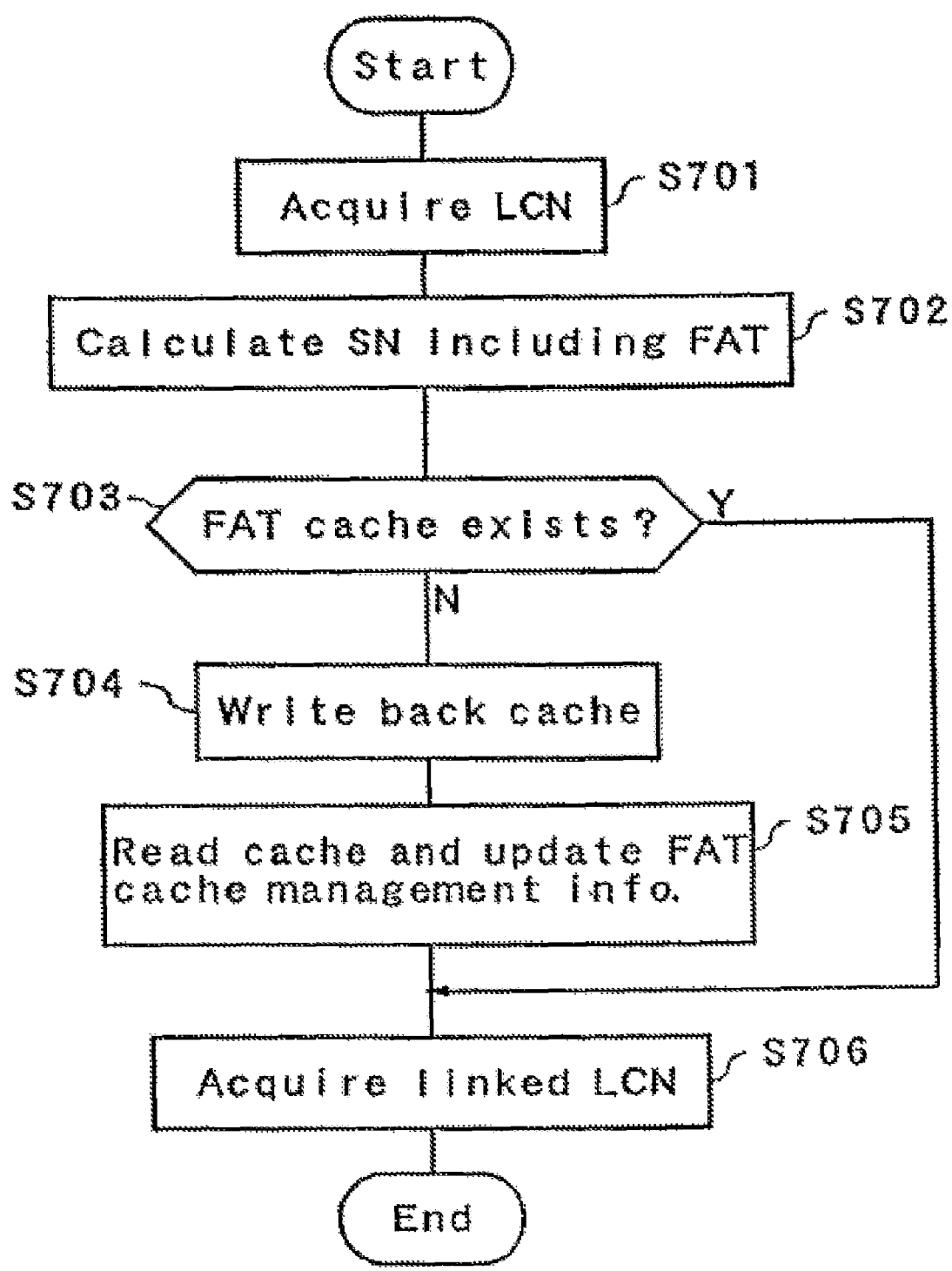
FIG. 7 is a flow chart showing a link destination acquisition processing in embodiment 1.

Subsequently, using the case where the information recording medium 110 is in the state shown in FIG. 4 and the FAT cache is in the state shown in FIG. 5 as an example, the link destination acquisition processing in this embodiment will be described. FIG. 7 is a flow chart showing flows of the link destination acquisition processing in this embodiment. In the acquisition processing, in response to a file access request issued from the application program 106 to the file system controller 107, the file system controller 107 issues a link destination acquisition request to the FAT cache controller 108. Then, the FAT cache controller 108 performs the link destination acquisition processing. The FAT cache controller 108 reads the FAT in the FAT cache as appropriate, and returns the cluster number of the acquired destination to be linked to the file system controller 107 after acquiring a destination to be linked.

In the destination to be linked processing, first, a cluster number LCN of a link source which intends to acquire a destination to be linked is acquired (S701). LCN is a cluster number indicating the file location accessed by the file system controller 107 and the file system controller 107 informs the LCN to the FAT cache controller 108.

Next, a sector number SN is calculated (S702). This is a sector including the FAT which stores an entry of the FAT corresponding to the LCN. It is assumed that the LCN is "2" and the corresponding entry of the FAT is stored in the leading sector of the FAT in the example shown in FIGS. 4 and 5. At this time, the SN becomes "1" indicating the leading sector of the FAT. Similarly, when a value of the LCN is large and the corresponding entry of the FAT exists at $100^{th}$ sector of the FAT, the SN becomes "100".

Since the reading size of the FAT is set as a fixed 1 sector in the link destination acquisition processing, through the above-mentioned processing, the reading location and reading size on the information recording medium 110 are determined. Subsequently, it is confirmed whether or not the FAT in the area to be read has already existed in the FAT cache (S703). When the FAT exists, the operation proceeds to the processing at S5706 as the processing after acquisition of the cache block. When the FAT in the area to be read does not exist in the FAT cache at S703, the reading of the FAT becomes necessary. Prior to the reading of the FAT, when no free area exists in the FAT cache, to secure the free area necessary for the reading of the FAT, arbitrary cache block is released. At this time, if the cache block to be released is updated in the FAT cache, the cache block is released after writing of the FAT to the information recording medium 110.

Next, the FAT is read into the FAT cache from the information recording medium 110 to update the FAT cache management information (S705). Through the above-mentioned processing, the FAT containing the entry of the link source cluster number becomes to exist in the FAT cache. Then, in the cache block of the FAT cache, the link destination cluster number is acquired and the acquired cluster number is informed to the file system controller 107 to finish the processing (S706).

As described above, in the link destination acquisition processing in this embodiment, the access controller 104 accesses to the FAT in units of sectors and reads the FAT into the FAT cache. In the link destination acquisition processing, since referring only a specific entry of the FAT enables acquisition of the link destination, the link destination can be rapidly acquired by access in units of sectors as the minimum access unit to the information recording medium.

In this embodiment described above, by changing the access size of the FAT according to the processing, the efficiency of FAT access can be improved. That is, in the free area retrieval processing, by performing access in units of erase blocks, the overhead for reading the FAT can be lessened, thereby shortening the worst time necessary for the free area retrieval processing can be achieved. In the acquisition processing, by performing access in units of sectors, the time necessary for one link destination acquisition processing can be shortened.

As shown in FIG. 5B, in the embodiment of the present invention, an example in which a set of four pieces of information consisting of the block start address, FAT address, FAT size and update flag is managed as the FAT cache management information 502 is described. However, as long as the FAT cache can be managed using similar information, the other form is available. Furthermore, in the free area retrieval processing, the following example is described: the cluster number at a last finishing location of the free area retrieval is held at a starting cluster number SCN of the free area retrieval and is used in the next free area retrieval processing. However, random number or the other value obtained, for example, by setting the head of the FAT each time, may be used.

Furthermore, although the information recording medium which is accessed fastest in units of erase blocks is assumed in this embodiment, the present invention may be applied to the information recording medium in which access capability does not depend on the access start location. In this case, although the FAT is cached in consideration of the boundary of the erase block, in a simpler manner, the FAT may be also cached in units of fixed-length blocks from the head of the FAT.

Embodiment 2

Figure 8:
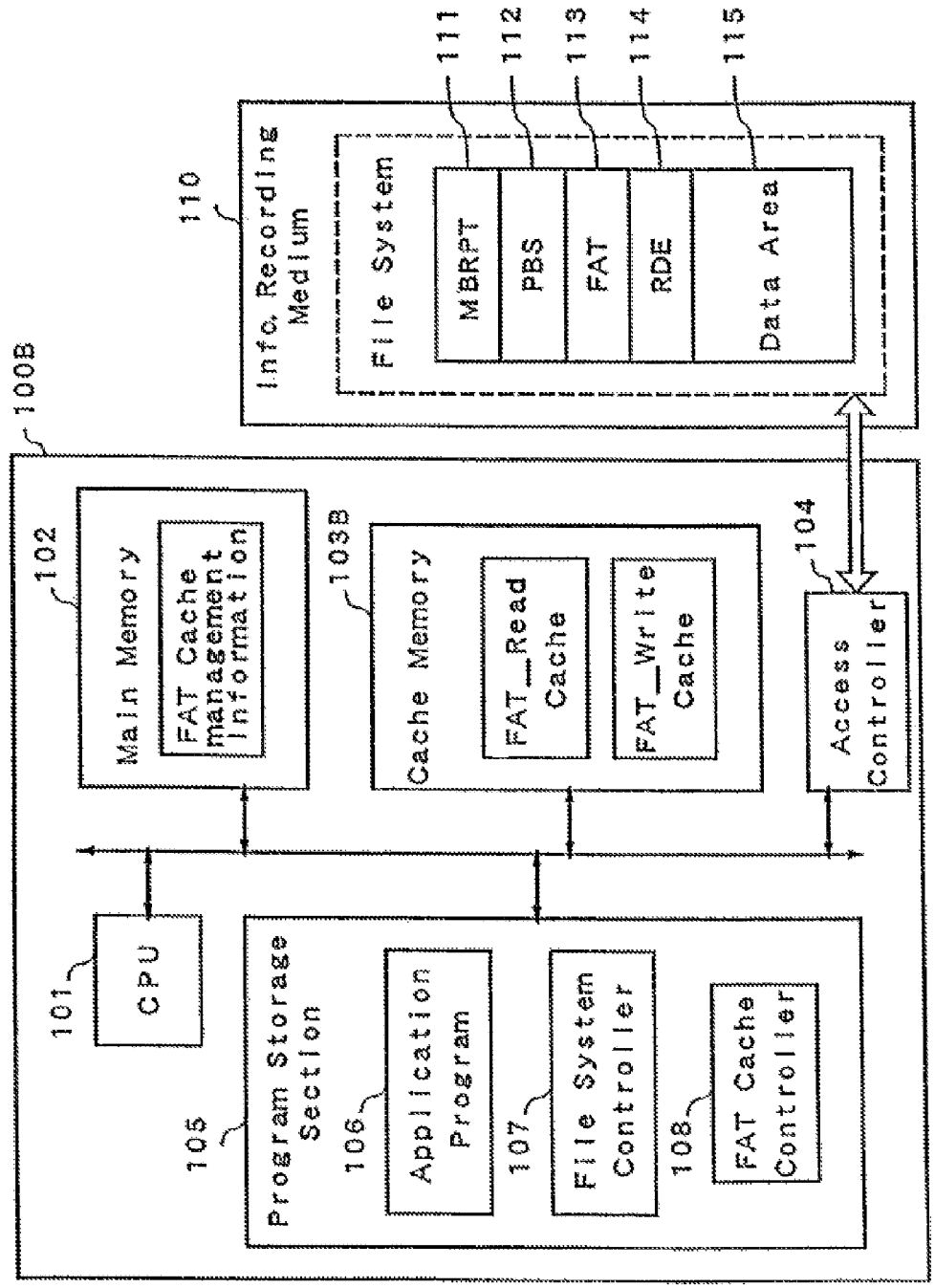
FIG. 8 is a configuration view of an information processor and an information recording medium in embodiment 2.

Next, a data area managing method in embodiment 2 of the present invention will be described. FIG. 8 is a configuration view of an information processor in embodiment 2 and the information recording medium. The information processor 100B in this embodiment is different from the information recording medium 100A in that a cache memory 103B includes two FAT caches of a FAT_Read cache and FAT_Write cache.

In this embodiment, two cache areas each having a different block size are prepared for the FAT caches and are suitably used for each different purposes. In the retrieval of the free area and FAT update to the information recording medium 110, the FAT_Write cache having a larger block size is used. In the acquisition of the link destination without link update, the FAT_Read cache having a smaller block size is used. By suitably using the two types of cache areas for each different purposes, the efficiency of access to the FAT is improved.

Subsequently, the FAT_Write cache and FAT_Read in the present embodiment will be described. FIG. 9 is an explanation view showing an example of the FAT_Read cache 901 and FAT_Write cache 902 which exist on the cache memory. The FAT_Read cache 901 consists of M sectors and is managed by the FAT cache controller 107 in FIG. 8 in units of sectors. The FAT_Read cache 901 is used only for FAT reading processing and in updating the entry of the FAT, for example, when file data is added, the FAT_Write cache 902 is used.

The FAT_Write cache 902 consists of N fixed-length blocks and is managed by the FAT cache controller 108 in units of fixed-length blocks. When the information recording medium 110 is a semiconductor memory, the erase block size is used as the size of the fixed-length block. In the example in FIG. 9, the fixed-length block size is 32 sectors. The FAT_Write cache 902 is used when the free area retrieval processing or update of the FAT to the information recording medium 110 is performed.

Figures 9A, 9B:
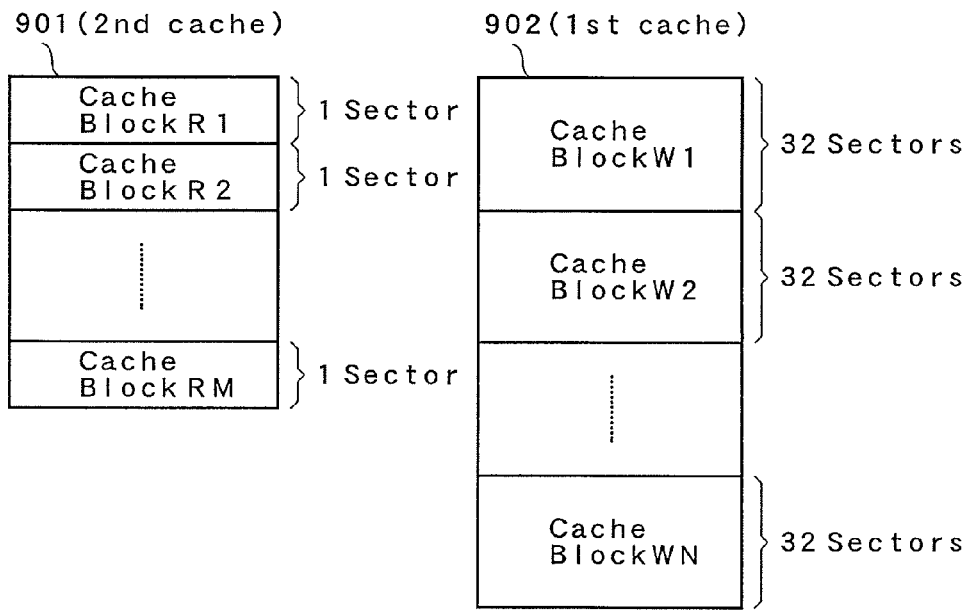
FIGS. 9A-9B are views showing an example of a FAT_Read and FAT_Write cache in embodiment 2.

FIG. 9B is an explanation view showing an example of a FAT cache management information 903 which stores information for managing the FAT_Read cache 901 and FAT_Write cache 902. FIG. 9B corresponds to the FAT_Read cache 901 and FAT_Write cache 902 in the state in FIG. 9A. The FAT cache management information 903 includes FAT address, FAT size and update flag. The FAT address indicates a region of a FAT read into the cache block lies in the FAT. The FAT size indicates the size of the FAT read into the cache block. The update flag is a flag which indicates whether or not the FAT in the cache block is updated. Using the three pieces of information as a set, the FAT cache management information 903 includes M sets of information for FAT_Read cache 901 and N sets of information for FAT_Write cache 902.

Since the FAT_Read cache 901 is managed in units of sectors and each cache block stores information for 1 sector therein, in the cache block reading information on the FAT thereinto, the FAT size becomes "1" inevitably. The FAT_Read cache 901 is used only for the reading processing. For this reason, the FAT on the cache block is not updated and thus, the update flag is set in the state of "non updated" at all times. Furthermore, in the cache block not currently used, "0xFFFF" indicating the unused state is set as information on address and size. Here, a decimal value 65535 corresponding to "0xFFFF" is a value which is not used as valid address or size in this embodiment.

Figure 10:
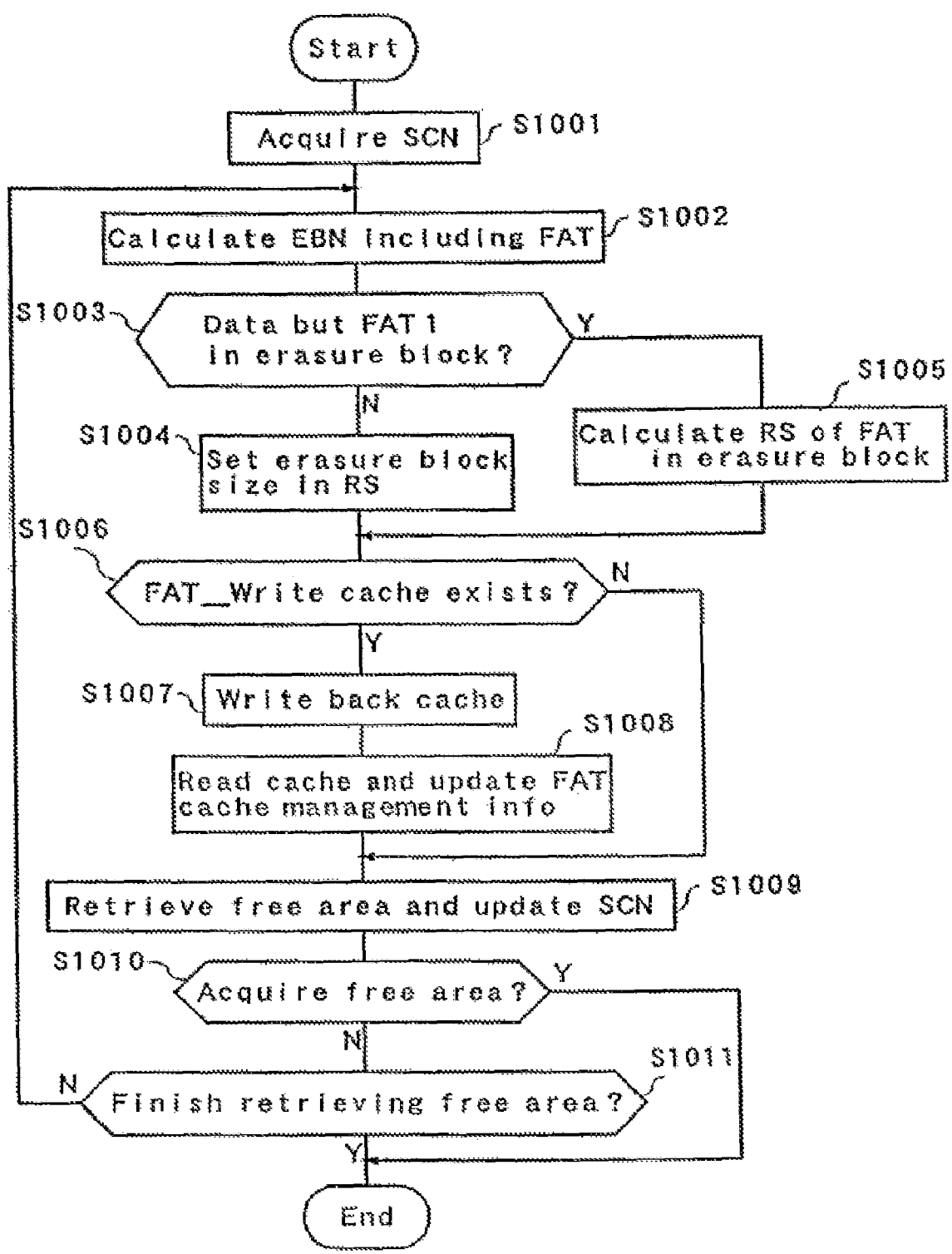
FIG. 10 is a flow chart showing a free area retrieval processing in embodiment 2.

Subsequently, the free area retrieval processing in this embodiment will be described. FIG. 10 is a flow chart showing the flow of the free area retrieval processing in this embodiment. The free area retrieval processing is different from that in embodiment 1 in that only the FAT_Write cache is used for the cache of FAT and that there is no processing of determining the size of the cache block after the condition that the FAT_Write cache in the area to be read exists at S1006.

The reason why there is no processing of determining the size of the cache block is because the applied cache is only the FAT_Write cache and when the FAT_Write cache in the area to be read exists, the size of the cache block is predetermined fixed length (for example, 32 sectors) at all times.

Figure 11:
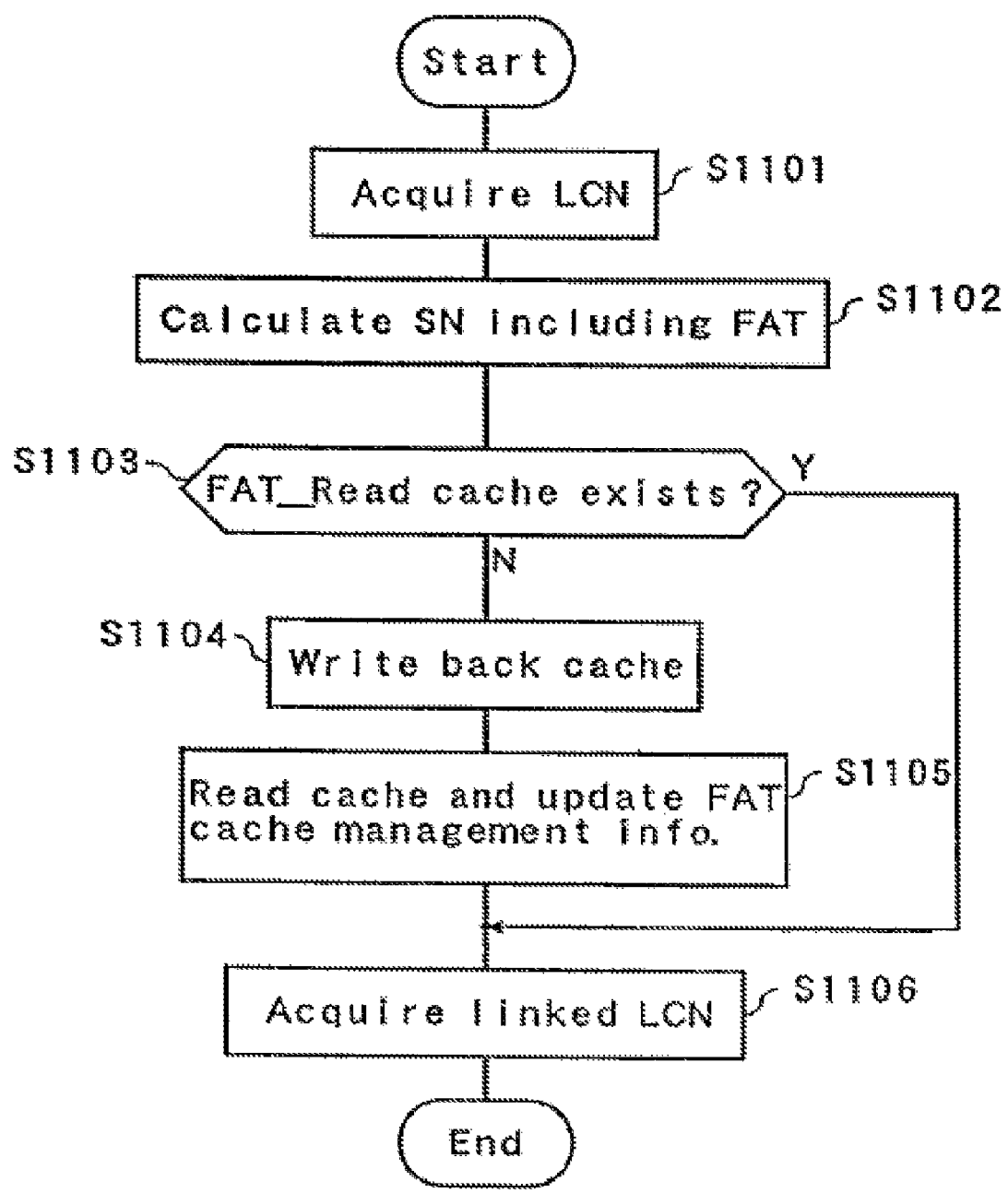
FIG. 11 is a flow chart showing a link destination acquisition processing in embodiment 2.

Link destination acquisition processing in this embodiment will be described. FIG. 11 is a flow chart showing the flow of the link destination acquisition processing in this embodiment. This link destination acquisition processing is different from that in embodiment 1 in that only the FAT_Read cache is used for the cache of FAT.

The procedure for using the FAT_write cache in the free area retrieval processing and for using the FAT_Read cache in the link destination acquisition processing have been described herein. When processings involving the FAT update such as addition of file data and deletion of file are performed, an operation for FAT_Write cache is performed as the operation in the free area retrieval processing.

As has been described, in embodiment 2, by suitably using the two caches each having different block size for each different purposes when accessing to the FAT, the efficiency of access to the FAT can be improved. That is, when the access to the FAT in the relatively large units is more efficient, for example, in the free area retrieval processing and FAT update processing, the cache having the larger block size is used. When access to the FAT in the relatively small units is more efficient, for example, in the link destination processing, the cache having the smaller block size is used. Whereby, overhead at the access to the FAT can be lessened, thereby enabling the access to the FAT more efficiently.

In the embodiment of the present invention, an example in which a set of three pieces of information consisting of the FAT address, FAT size and update flag is managed as the FAT cache management information is described. However, as long as the FAT cache can be managed using similar information, the other form is available. Furthermore, although the information recording medium which is accessed fastest in units of erase blocks is assumed in the embodiment of the present invention, the present invention may be applied to the information recording medium in which access capability does not depend on the access start location. In this case, although the FAT is cached in consideration of the boundary of the erase block, in a simpler manner, the FAT may be also cached in units of fixed-length blocks from the head of the FAT. The data area managing method is not limited by the sector size or erase block size.

INDUSTRIAL APPLICABILITY

According to the data area managing method of the present invention, when data is read or written from or into the information recording medium by using the FAT, a rapidly accessing to data can be performed without applying a load to the memory source of the information processor concerning the FAT. For this reason, the method can be widely applied to Personal Digital Assistants (PDA) having a limited memory capacity, information processors with a cache memory, etc. Moreover, the present invention is suitable for the information processor having the nonvolatile semiconductor memory, hard disk, optical disk or the like as the information recording medium.

The invention claimed is:
1. A data area managing method for an information recording medium, the method is used in an information processor that manages data stored in an information recording area in the information recording medium as a file, wherein
when said information processor accesses to area management information that manages a free area state and link state of the information recording area in said information recording medium,
said information processor reads out data of a first access size from said area management information when updating said area management information, and reads out data of a second access size smaller than said first access size from said area management information when retrieving a link state referring to said area management information.
2. The data area managing method according to claim 1, wherein
said second access size is a minimum reading size from and writing size to said information recording medium.

3. The data area managing method according to claim 1, wherein
   said information recording medium is an NAND flash memory.

4. The data area managing method according to claim 1, wherein
   said first access size is a size of an erase block determined from physical characteristics of said information recording medium.

5. The data area managing method according to claim 4, wherein
   said first access size when accessing to a head or end of said area management information is smaller than said size of said erase block.

6. The data area managing method according to claim 1, wherein
   said information processor comprises:
   a first cache used for updating said area management information; and
   a second cache used for retrieving a link state referring to said area management information, and
   said information processor stores data of said first access size read for said area management information to said first cache, and stores data of said second access size read for said area management information to said second cache.

* * * * *